(12) United States Patent
Buedenbender et al.

(10) Patent No.: US 7,908,849 B2
(45) Date of Patent: Mar. 22, 2011

(54) BLADED SHELL OR STATOR SHELL FOR A HYDRODYNAMIC TORQUE CONVERTER, METHOD FOR PRODUCING A STATOR SHELL OF SAID TYPE, AND HYDRODYNAMIC TORQUE CONVERTER HAVING A STATOR SHELL OF SAID TYPE

(75) Inventors: Christine Buedenbender, Buehlertal (DE); Christian Huegel, Rheinau (DE); Bruno Mueller, Sasbach (DE); Christopher Shamie, Wadsworth, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 224 days.

(21) Appl. No.: 12/284,647

(22) Filed: Sep. 24, 2008

(65) Prior Publication Data

US 2009/0071138 A1 Mar. 19, 2009

Related U.S. Application Data (63) Continuation of application No. PCT/DE2007/000388, filed on Mar. 1, 2007.

(60) Provisional application No. 60/785,739, filed on Mar. 24, 2006, provisional application No. 60/785,790, filed on Mar. 24, 2006.

(30) Foreign Application Priority Data

Oct. 21, 2006 (DE) .......................... 10 2006 049 738

(51) Int. Cl.
*F16H 41/26* (2006.01)
*F16D 33/00* (2006.01)
(52) U.S. Cl. ........................................... 60/330; 60/345
(58) Field of Classification Search .................... 60/330, 60/345
See application file for complete search history.

(56) References Cited

U.S. PATENT DOCUMENTS

| 3,572,034 A | 3/1971 | Fisher |
| 5,465,575 A * | 11/1995 | Shimmell ....................... 60/345 |
| 2006/0024161 A1 | 2/2006 | Ackermann |

* cited by examiner

*Primary Examiner* — Thomas E Lazo
(74) *Attorney, Agent, or Firm* — Simpson & Simpson, PLLC (57) ABSTRACT

A stator shell for a hydrodynamic torque converter (1), wherein said stator shell (2) comprises a plurality of blades (32, 34), wherein said stator shell (2) comprises plural components (20, 22), produced separately from one another and respectively comprising one or plural blades (32, 34) of said stator shell (2), wherein said components (20, 22) are fixated to one another and disposed relative to one another, so that blades (32, 34) of several of said components (20, 22) are disposed respectively offset relative to one another in a circumferential direction forming gaps provided in said circumferential direction extending about a central axis of the stator shell (2), wherein each of said blades (32, 34) is configured from an integral component between its respective leading edge and its respective trailing edge, so that each of the blades (32, 34) is respectively configured integrally from one of the components (20 or 22).

18 Claims, 4 Drawing Sheets

Fig. 1

|  | $N_S$ | B | d | b at Blade ID |
|---|---|---|---|---|
| NWG-Converter | 39 | 61,471 | 203,1 | 11,84 |
| A-Class Converter | 27 | 56,4 | 182,3 | 12,93 |
| Aisin-Converter | 28 | 51,958 | 166,73 | 9,69 |

|  | b at Blade OD | $b_{mean}$ | $b_{min}/d$ |
|---|---|---|---|
| NWG-Converter | 13,45 | 12,645 | 0,058 |
| A-Class Converter | 11,18 | 12,055 | 0,061 |
| Aisin-Converter | 9,63 | 9,66 | 0,058 |

|  | $b_{mean}/d$ | $b_{min}/B$ | $b_{mean}/B$ | $N_S/d$ |
|---|---|---|---|---|
| NWG-Converter | 0,0623 | 0,193 | 0,206 | 0,192 |
| A-Class Converter | 0,0661 | 0,198 | 0,214 | 0,148 |
| Aisin-Converter | 0,0579 | 0,185 | 0,186 | 0,168 |

BLADED SHELL OR STATOR SHELL FOR A HYDRODYNAMIC TORQUE CONVERTER, METHOD FOR PRODUCING A STATOR SHELL OF SAID TYPE, AND HYDRODYNAMIC TORQUE CONVERTER HAVING A STATOR SHELL OF SAID TYPE

CROSS REFERENCE TO RELATED APPLICATIONS

This application is filed under 35 U.S.C. §120 and §365(c) as a continuation of International Patent Application PCT/DE2007/000388, filed Mar. 1, 2007, which said application claims priority from U.S. Provisional Patent Application No. 60/785,739 filed on Mar. 24, 2006, and U.S. Provisional Patent Application No. 60/785,790 filed on Mar. 24, 2006, and German Patent Application No. 10 2006 049 738.4, filed Oct. 21, 2006, which applications are incorporated herein by reference in their entirety.

The invention relates to a stator shell for a hydrodynamic torque converter, a method for producing such stator shell, and to a hydrodynamic torque converter comprising such stator shell.

The design of the hydrodynamic components for torque converters is often restricted by tight installation space specifications. The blading of the stator shell typically requires a large amount of room in axial direction. The components "pump" and "turbine" have to be adjusted accordingly.

The production of stator shells for torque converters is typically performed in cast aluminum according to the state of the art. Also, plastic stator shells are used in the state of the art. The blades are characterized by a profile with advantageous flow properties. Often, NACA-profiles are used for the blade design. However, also other profiles are being used. When producing components with high-pressure die-casting methods, a differentiation is made between stator shells, which are demolded in axial direction and in radial direction. Axially demolded stator shells are more economical to produce, but restricted with respect to the shape of the blades (typically e.g. there are no blade overlaps possible). Radially demolded stator shells typically offer more options for blade design, but they are typically very complex to manufacture and thus expensive.

From U.S. Pat. No. 3,572,034, a stator shell for a hydrodynamic torque converter is known, which is formed by two axially adjacent, separately produced, and joined shaped sheet metal components, wherein each of said shaped sheet metal components provides a radial inner ring and a radial outer ring, and wherein the two outer rings thus formed are connected amongst one another, and wherein the two inner rings thus formed are connected amongst one another. Between the inner rings and the outer rings, blades are formed. These blades are formed by bending sections of said blades out of the formed sheet metal components, and thus, so that each of the blades is assembled from two separate components. This is performed so that one of the two shaped sheet metal components forms the leading edge of the blade for each of the blades and portions adjacent thereto, and the other of the two shaped sheet metal components forms the respective blade trailing edges with the portions adjacent thereto, so that respective blades are formed by the portions provided by the two shaped sheet metal components, wherein said blades are produced from two components respectively.

The invention is thus based on the object to provide a stator shell for a hydrodynamic torque converter, which requires little axial installation space for its blades, and which is furthermore economical and simple to produce.

According to the invention, now in particular, a stator shell is proposed. A torque converter according to the invention also is shown. A method according to the invention also is shown.

A bladed shell or a stator shell for a hydrodynamic torque converter is proposed. The stator shell comprises a plurality of blades. The stator shell includes plural components, which are manufactured separate from one another, and which respectively comprise one or plural blades of the stator shell, the components are fixated to one another, and disposed relative to one another, so that the blades of different components are disposed respectively offset relative to one another in the circumferential direction, extending about a central axis of the stator shell, while forming gaps provided in said circumferential direction. Each of the blades is configured as an integral component between its respective leading edge and its respective trailing edge, so that each of the blades is formed by exactly one of the components, including one or plural blades of the stator shell formed integrally. Thus, it is provided in contrast to the configuration known from U.S. Pat. No. 3,572,034 that each of the blades is made respectively from an integral component, and thus, not as provided in U.S. Pat. No. 3,572,034, made respectively from two components, one of which provides the section with the leading edge, and the other provides the section with the trailing edge. Different blades can be, however, associated with different components in an advantageous embodiment of the invention, or can be formed by said components. An improvement is advantageous in particular, in which blades adjacent in circumferential direction are respectively formed by separate components.

Furthermore, a bladed shell or a stator shell for a hydrodynamic torque converter is proposed, wherein the blades of said bladed shell or stator shell and/or the components comprising the one or plural blades are made of sheet metal.

Furthermore, a stator shell for a hydrodynamic torque converter is proposed, which includes plural components produced separately from one another, and each comprising one or plural of the blades of the stator shell, which are fixated amongst one another, and which respectively comprise an inner ring and an outer ring, the axial distance of two adjacent outer rings deviates from the axial distance of the inner rings associated with said two outer rings, in order to form a spread, for example, increasing the axial stiffness.

In an advantageous improvement, each of the blades is made of solid material, thus, for example, is not configured as a hollow blade.

It can be provided that the blades respectively substantially comprise a constant thickness. The blades preferably comprise a rectangular shape, transversal to the thickness.

A stator shell is provided with a bladed shell, formed from sheet metal, for example, for use in a torque converter.

Furthermore, for example, a bladed shell or a stator shell for a hydrodynamic torque converter is proposed, the bladed shell or stator shell includes a radially interior inner ring device and a radially exterior outer ring device, and a plurality of blades, which are provided radially between the inner ring device and the outer ring device, the minimum axial blade length is less or equal to 9.5 mm, and/or the ratio of minimum axial blade length to the outer diameter of the blading assumes values, which are less or equal to 0.056, preferably less or equal to 0.035, preferably less or equal to 0.02, and/or the ratio of minimum axial blade length to converter width, for example, the converter width of a torque converter, in which the bladed shell or stator shell is installed, is less or equal to 0.18, preferably less or equal to 0.15, preferably less or equal to 0.12, preferably less or equal to 0.1, and the number of blades is greater or equal 40, preferably greater or equal to 46, preferably greater or equal to 50, preferably greater or equal to 56, or preferably greater or equal to 60.

Furthermore, a torque converter for motor vehicles is proposed. The torque converter includes a pump shell, a turbine shell and a stator shell, and the stator shell is configured according to the invention.

Furthermore, a method is proposed according to the invention for producing a stator shell for a hydrodynamic torque converter, which includes the following steps: providing at least one piece of sheet metal or a sheet metal blank; processing the sheet metal or the sheet metal blank by cutting; and, processing the sheet metal or the sheet metal blank, which define a plane by working the material for forming a component of the stator shell, which comprises at least one, preferably plural, blades of the stator shell. In the context of working the material, one or plural blades of the stator shell to be produced are dislocated or bent, so that they are dislocated relative to the plane of the sheet metal or relative to the plane of the sheet metal blank.

Figure 1:
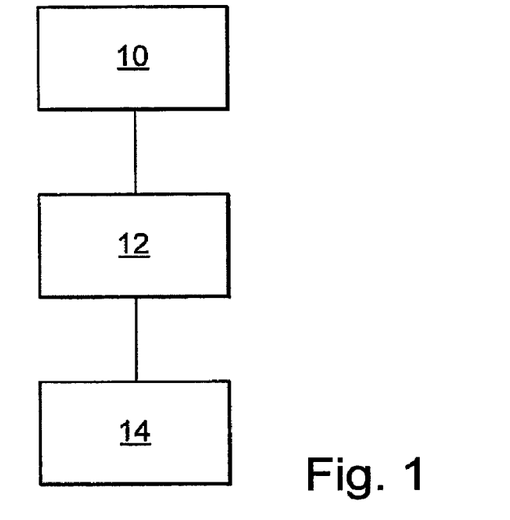
FIG. 1 shows the steps of an exemplary method according to the invention in a schematic depiction.

Subsequently, embodiments of the invention shall be defined in more detail, based on the appended figures, without thereby limiting the invention. Thus, the figures show the following:

FIG. 1 illustrates the steps of an exemplary method according to the invention.

In step 10, at least one piece of sheet metal or a sheet metal blank is provided.

In step 12, said piece of sheet metal or said sheet metal blank is processed by separating, e.g. through cutting or laser cutting or sawing or similar. This can be performed e.g., so that the sheet metal or the sheet blank is formed into a round sheet metal blank or into a round piece of sheet metal. It can be furthermore provided in step 12, that sections are generated, which are blades or blade sections or which form blades in the finished stator shell. For this purpose, for example, the circumferential contours or sections of the circumferential contours can be generated by cutting. It can, for example, be provided, that the stator shell to be produced includes an inner ring and/or an outer ring and that in the context of the cutting according to step 12, a section is generated, which is intended to form the outer ring and/or a section is generated, which is intended to form the inner ring later on, and/or sections are generated, which are to subsequently form blades. Thus, it can be provided that the cutting is performed, so that after separating the blades or the sections, which are to form blades, remain integrally connected to the section, which is to form the inner ring later on, and/or to the section, which is to form the outer ring later on.

It is appreciated in this context that it can also be provided in a modification that only those portions are contoured in the context of the cutting, which are to form blades thereafter. According to another alternative configuration, it can be provided, that portions are contoured in the context of the cutting, which are to form blades of the stator shell later on, and a portion is contoured, which is to form an outer ring later on. In another alternative embodiment, it can be provided, that a portion is contoured in the context of the cutting, which is to form an inner ring of the stator shell later on, and portions are contoured, which are to form blades of the stator shell later on.

It can thus also be provided, for example, that the component or a component of the stator shell, which is formed from the sheet metal or from the sheet metal blank, is a component, which includes or forms one or plural blades and an inner ring and no additional outer ring. However, it can also be provided, that the component or a component, which is formed from the sheet metal or from the sheet metal blank, is a component, which includes or forms an inner ring of the stator shell and several blades, but not an outer ring of the stator shell.

It can furthermore be provided, that the component or a component, which is formed from the sheet metal piece or from the sheet metal blank, is configured, so that it includes or forms an inner ring and an outer ring and one or plural blades, radially extending between the inner ring and the outer ring.

In step 14, the sheet metal piece or the sheet metal blank defining a plane is processed by forming the material, in order to form a component of the stator shell, including at least one blade. This forming process can be performed in particular by bending and/or deep drawing.

In the context of said forming process, it is provided, that one or plural blades of the stator shell to be produced are displaced or bent, so that they are displaced relative to the plane of the sheet metal piece or of the sheet metal blank. Thus, it is preferably provided, that the sheet metal piece or the sheet metal blank, at least before forming, define a plane, which is in particular perpendicular to the rotation axis of the completed component or of the completed stator shell.

It is provided in a preferred embodiment of the method according to the invention, that several components of the stator shell to be produced are manufactured as described above. The exact contour of these various components can thus have certain differences. It can be provided, for example, that the components thus created are configured, so that they can be axially joined, for example, with respect to the axial direction of the rotation axis of the stator shell to be joined. These components can differ from one another, in particular also with respect to the number of blades created.

Thus, it is provided according to said improvement that several components of the stator shell to be produced are made from one piece of sheet metal each, and the components respectively include blades of the stator shell to be produced. The blades are thus configured, for example, so that they form complete blades, which are thus complete from the leading edge of the blade to the trailing edge of the blade over the entire blade.

It can e.g. be provided that the particular components produced according to a method described with reference to FIG. 1 of the stator shell to be produced, are each configured so that they include an inner ring and an outer ring, and blades extending radially between the inner ring and the outer ring. The blades are integrally connected to the respective inner ring and integrally connected to the respective outer ring, or are created in their respective entirety from an integral piece of sheet metal or from an integral sheet metal blank.

The various components discussed of the stator shell to be created are then joined according to the improvement, and in particular, with reference to the axis orientation of the rotation axis of the stator shell to be axially joined. Before said joining, they are, however, brought in position relative to each other, so that the blades of various components of the stator shell to be produced, respectively comprising one or plural blades, are offset relative to all blades with respect to the circumferential direction relating to the central longitudinal axis of the stator shell to be produced. The blades are integral parts of any of the components including one or plural blades.

This is performed, for example, so that between any blade of one of the components and any blade of one or of each of the other components, with reference to the circumferential direction of the central longitudinal axis of the stator shell to be created, a circumferential offset is formed while forming a respective gap.

In a preferred embodiment, the components respectively including one or plural blades are positioned relative to one another before joining, so that after joining, with reference to the circumferential direction defined by the central longitudinal axis of the stator shell to be generated, substantially the same distances of adjacent blades are provided in circumferential direction. This relates, for example, respectively to the same radial position with reference to the radial direction of said central longitudinal axis.

In a preferred embodiment, it is thus provided, that with reference to the radial direction of the central longitudinal axis of the stator shell to be generated, at least one radial position exists, with reference to which the circumference about said central longitudinal axis is less than the sum of the offset dimensions between the leading edge and the trailing edge of the respective blades, which exist at circumferential positions corresponding to the radial dimension. Thus, at least with reference to the radial direction of the central axis, the following applies for the positions associated with a radial dimension of the stator shell: when the value $2*\pi*$(radius of said radial position)$\leqq$(sum of the offset dimensions, which is to be calculated as follows): at said radial position, the offset dimension between the leading edge and the trailing edge of the respective blade is determined for each blade, the offset dimension provided at the radial position. The sum is then formed, so that the offset dimension, provided at the respective radial position, enters into said sum for all blades of the stator shell. The sum thus formed is thus greater than the circular circumference, which is provided at the respective radial position, and which can be calculated according to the formula: circumference=$2*\pi*$ (radius of the respective radial position).

Subsequently, one or more embodiments of the method, for example, described with reference to FIG. 1, will be described in more detail.

The production of a stator shell/bladed shell or of a stator shell can be performed from one or several stationary sheet metal blanks or sheet metal pieces. The sheet metal blanks or sheet metal pieces can, for example, be generated in the context by a separation process, or can be formed as round sheet metal pieces or as sheet metal blanks. The blades are, for example, bent by a forming tool out of the plane of the sheet metal blank, which is prefabricated accordingly. By using two or plural sheet metal blanks, whose blades subsequently interlock with one another at an offset, also bladed shells or stator shells with very tightly spaced and/or overlapping blades can be manufactured in a simple manner (small or negative visual clearance). This way, very narrow stator shells with a high number of blades can be implemented. When bending upward, the blades obtain the blade angle distribution required for the respectively desired hydrodynamic properties, by which the flow deflection is determined. The bladed shell, which is obtained after the bending or forming process, can be used without further forming, in order to reduce manufacturing cost, or it can also be optimized by additional forming steps (for example, embossing the leading edges and the trailing edges of the blades, compressing the edges, etc.) with respect to its hydrodynamic properties.

The configuration of the stator shell or of the bladed shell can be performed with blades, comprising free ends on the radial outside, or terminating in a flat outer portion of the sheet metal blank. In order to reduce the leakage volume flows through the gaps between the turbine or the turbine shell and the stator shell or between the stator shell and the pump or the pump shell, the planar outer portion of the blank or of the sheet metal piece can also be bent towards the desired side in additional process steps. Connecting the bladed shells to the stator shell hub can e.g. be performed by bolting, riveting, welding or other joining techniques.

Figure 2:
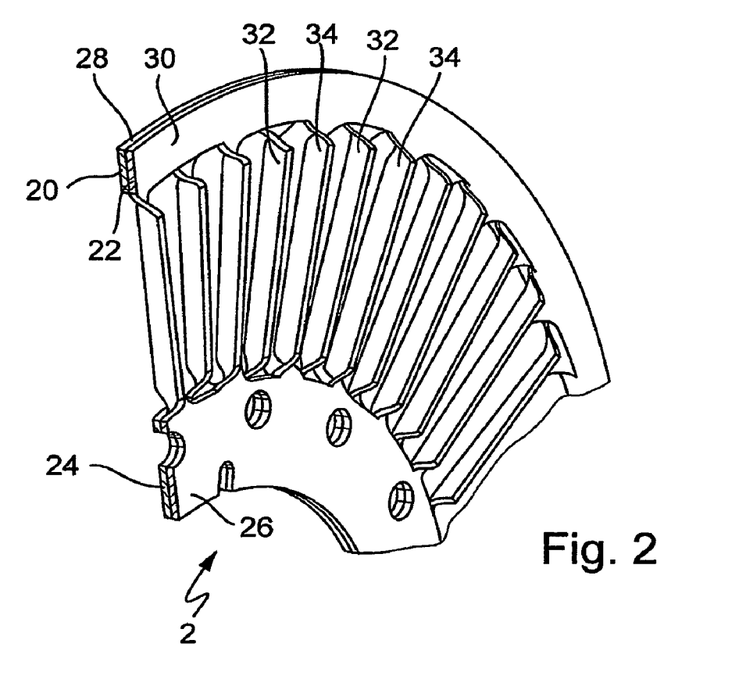
FIG. 2 shows an embodiment of a bladed shell or a stator shell according to the invention in a three-dimensional view, comprising two-interlocking blade plates.

FIG. 2 shows an exemplary bladed shell or a stator shell 2 according to the invention in a schematic illustration. Bladed shell or stator shell 2 includes two, for example, exactly two, components 20, 22, which are blade plates or stator shell plates 20, 22, in this case. This is performed here so that components 20, 22 or blade plates 20, 22 or stator shell plates 22, interlock with one another. Each of the two components 20, 22 or bladed shells 20, 22 or stator shells 20, 22, subsequently, for reasons of simplification reference is made to blade plates 20, 22, include, respectively, an inner ring 24 or 26, an outer ring 28 or 30, and a plurality of blades 32 or 34.

It is appreciated that according to the embodiment according to FIG. 2, a configuration is described, in which the bladed shell or stator shell 2 comprises two or exactly two components 20, 22 with one respective inner ring 24, 26, an outer ring 28, 30, and blades 32, 34, wherein it is appreciated, that in order to form the bladed shell or stator shell 2 also more than two such components 20, 22 can be provided, as e.g. three components or four components or five components, or more than five components. Thus, for example, the following applies: Inner rings 24, 26 of components 20 or 22 are substantially configured, so that they can be placed next to each other or on top of one another, so they match, and thus, for example, in the viewing direction of the axial direction of the bladed shell or of stator shell 2. Also, outer rings 28 and 30 are substantially configured so that they can be substantially placed next to each other or on top of one another, and thus, for example, in a viewing direction in the axial direction of the bladed shell or of stator shell 2.

Components 20 and 22 contact one another, for example, in axial direction and in particular so that inner rings 24 and 26, on the one hand, and outer rings 28, 30, on the other hand, viewed in axial direction of the bladed shell or of stator shell 2, rest on top of one another, so they substantially match. Components 20, 22, however, are disposed rotated relative to one another with reference to the circumferential direction of the central longitudinal axis or of rings 24, 26, 28, 30, so that blades 32, which are configured by component 20, are configured in circumferential direction respectively offset from blades 34, which are formed by component 22.

In the embodiment according to FIG. 2, it can, for example, be provided, that the number of the blades 32, which are formed by component 20, is equal to the number of blades 34, which are configured by or at component 22. Thus, it can be provided, that in a circumferential gap between two respective circumferentially adjacent blades 32 of component 20, one respective blade 34 of component 22 is provided, so that alternatively, blades of component 20 and blades of component 22 are provided in circumferential direction. However, it can also be provided alternatively, that the number of blades 32, which are configured by component 20, is greater than the number of blades 34, which are configured by or at component 22, or that the number of blades 32, which are configured by component 20, is less than the number of blades 34, which are configured by or at component 22.

Component 20 is fixated, or fixed, to component 22, for example, by welding or soldering or bolting or any means known in the art. As shown in FIG. 2, blades 32, 34 are respectively disposed so that their main extension or the surface defined by them is not disposed in the plane, which is defined by rings 24, 26, 28, 30. Blades 32, 34 are rotated or twisted with reference to the plane, which is defined by rings 24, 26, 28, 30.

The configuration illustrated in FIG. 2 can be manufactured in a preferred embodiment according to a method described with reference to FIG. 1 and can be improved according to the improvements illustrated therein.

It is appreciated that in the embodiment according to FIG. 2, blades 32 are integrally connected to inner ring 24 and to outer ring 28, or that they are fabricated from an integral component, and that blades 34 are integrally connected to inner ring 26 and to outer ring 30, or fabricated from an integral component.

In one embodiment, the bladed shell or stator shell 2 is milled from aluminum. In another embodiment, the bladed shell or stator shell 2 is formed from sheet metal. The measurements of the characteristic diagram of the aluminum embodiment show comparable properties like a conventional stator shell, which comprises, for example, 27 blades, with an identical blade angle distribution. However, the meriodional length was reduced by approximately 50%, and the number of blades was doubled to 54.

A design formed from sheet metal can be configured, for example, so that two sheet metal components with 27 blades each are provided. The two sheet metal components can, for example, be planar at the outer radius and at the inner radius. The axial offset of the blades caused by the "stacking" of the two sheet metal components is compensated in an advantageous manner. This can also be left out, since tests have shown that this only results in minor differences of the characteristic diagram.

Thus, for example, a bladed shell for stator shells of torque converters, which is formed from sheet metal, is provided to reduce installation space and cost. The production is performed, for example, by means of a bending tool from sheet metal blanks, which are prefabricated accordingly. By using two or several blanks, which can be mounted with an offset after forming, also stator shells with very tightly spaced or overlapping blades can be implemented easily. This way, also very narrow stator shells with high numbers of blades can be implemented.

As it is shown in the configuration according to FIG. 2, very narrow stator shells with high numbers of blades can thus be implemented at least according to improvements of the invention. At least according to improvements of the invention, a reduction of the installation space through narrow bladed shells or stator shells with a high number of blades and a reduction of the manufacturing cost is facilitated by using a bladed shell or stator shell formed from sheet metal.

Figure 3:
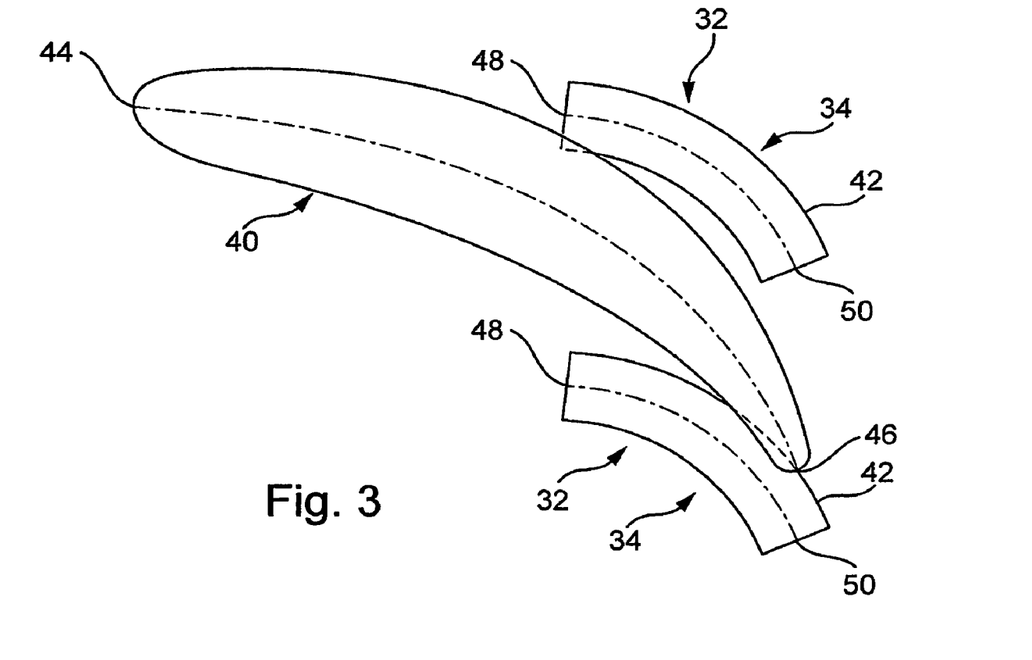
FIG. 3 shows a conventional blade profile of a stator shell in comparison to a profile of a bladed shell or bladed profile, formed from sheet metal, or of an exemplary stator shell according to the invention.

FIG. 3 shows an exemplary conventional blade profile 40, in comparison to an exemplary profile 42 of a bladed shell or a stator shell formed from sheet metal. The exemplary profile 42, which is formed from sheet metal, is, for example, a profile according to an exemplary embodiment of the invention, like, for example, the embodiment according to FIG. 2 or the embodiment according to FIG. 4.

It is evident from FIG. 3, that the distance from the leading edge 44 to the trailing edge 46 in a conventional blade profile is greater than the distance from the leading edge 48 to the trailing edge 50 of the exemplary blade profile 42. It is appreciated that the distance between the respective leading edge and the respective trailing edge is in particular the distance measured along the respective camber line. Furthermore, it is apparent from FIG. 3, that the conventional blade profile 40 is configured more rounded and that the exemplary blade profile according to the invention can comprise, for example, a substantially constant blade thickness.

Figure 4:
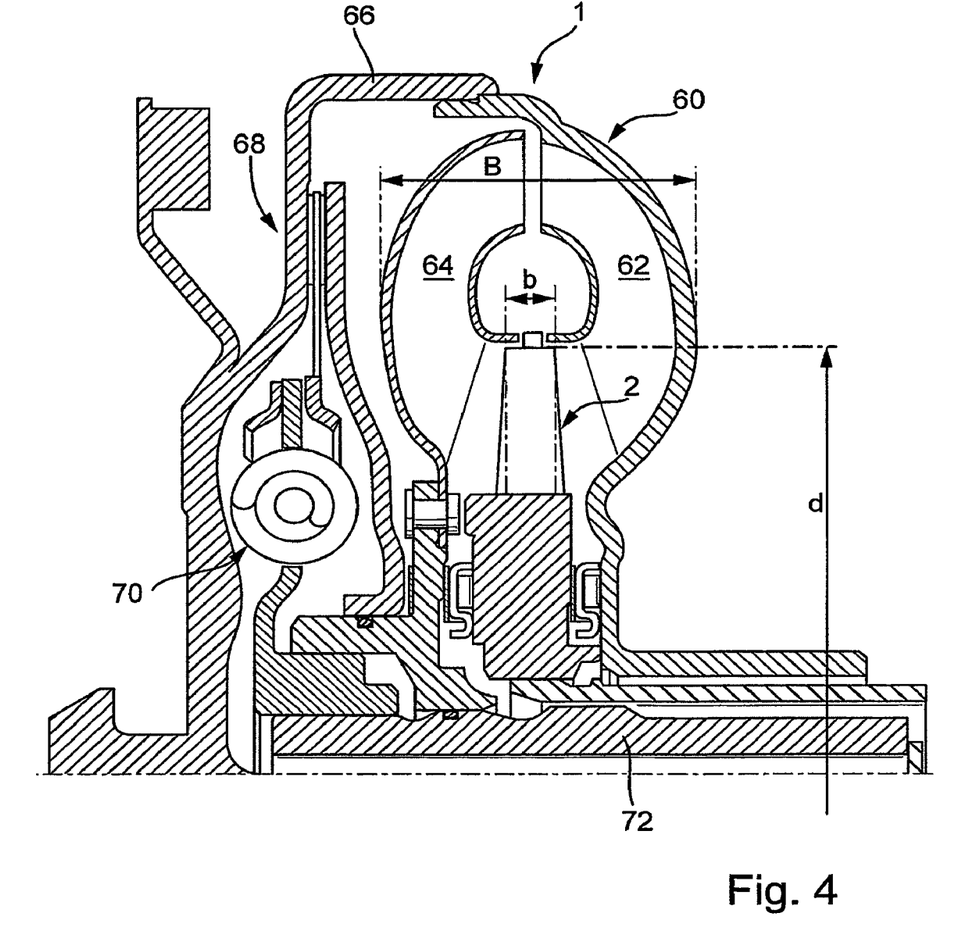
FIG. 4 shows an exemplary torque converter device according to the invention, including an exemplary stator shell according to the invention.

FIG. 4 shows an exemplary torque converter device 1 according to the invention, which comprises an exemplary stator shell 2 according to the invention, like, for example, the exemplary stator shell 2 described with reference to FIG. 2. Torque converter device 1 includes torque converter 60, comprising pump shell 62, turbine shell 64, and stator shell 2, configured in an exemplary manner according to the invention. Furthermore, torque converter device 1 includes converter housing 66 and converter lockup clutch 68. Torque converter device 1 furthermore includes torsion vibration damper 70. The converter housing can be coupled torque proof with an engine shaft or with a shaft, which is in driving connection therewith. From converter housing 66, torque can be transmitted through torque converter 60 to output shaft 72. This applies, for example, when torque converter lockup clutch 68 is open. By closing torque converter lockup clutch 68, torque can be transferred from converter housing 66 through torque converter lockup clutch 68, while bridging torque converter 60 to output shaft 72.

It is provided in the illustration, shown in FIG. 4 that minimum axial blade length b is less or equal to 9.5 mm, and/or the ratio of minimum axial blade length b to outer diameter d of the blading assumes values, which are less or equal to 0.056, and/or the ratio of minimum axial blade length b to converter width B is less or equal to 0.18. In an advantageous improvement, the number of blades $N_s$ of stator shell 2 in the configuration according to FIG. 4 is greater or equal to 40, and/or the ratio of blade number to the exterior diameter of the blading ($N_s$/d) is greater or equal to 0.2. This or the increase of the number of blades (which can alternatively also be increased to values out of the value range) can be, for example, the case, in order to counteract a deterioration of the hydrodynamic properties through the reduced axial blade length.

The production of such stator shells can be performed, for example, by high pressure die-casting or by bending the bladed shell from sheet metal. By adapting the components pump or pump shell and turbine or turbine shell to the stator shell, which is narrow, for example, the installation space required for the hydrodynamic circuit can be reduced or significantly reduced.

In an advantageous improvement, the stator shell or bladed shell 2 according to the configuration in FIG. 2 is used in the configuration according to FIG. 4. It can furthermore be provided that in the configuration according to FIG. 4, the blades include blade profiles, which correspond to the blade profile 42 according to FIG. 3.

In an advantageous improvement, the stator shell or the bladed shell is produced in a configuration according to FIG. 4 by a method according to the invention, which was described with reference to FIG. 1, or by an improvement of such method.

Figure 5:
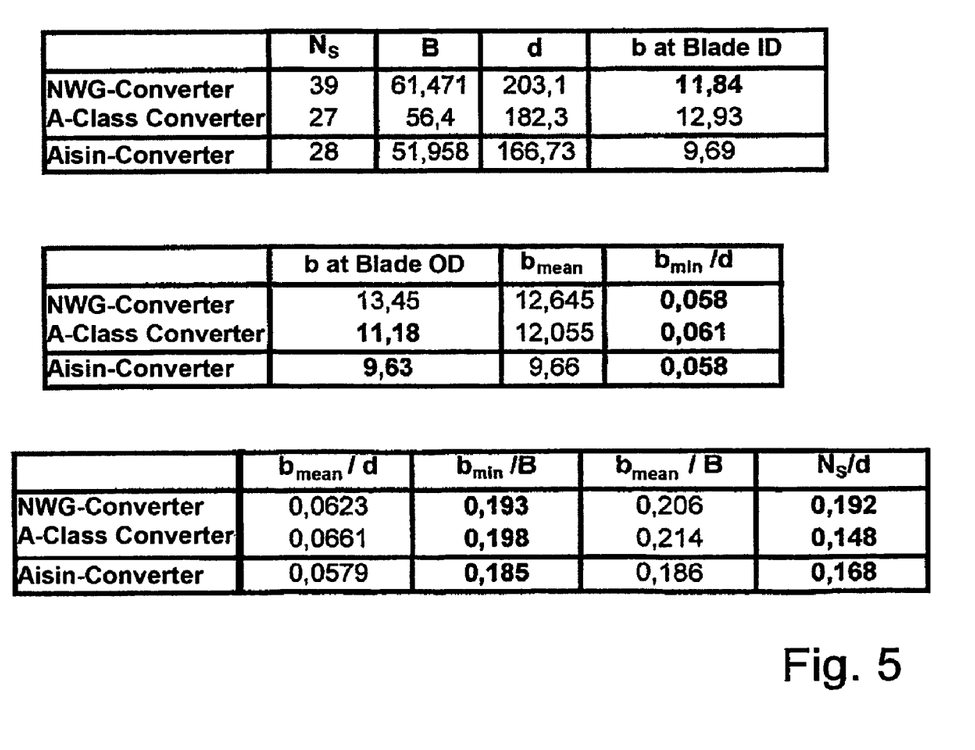
FIG. 5 shows a table with values, which can occur in an exemplary embodiment, for example, in the embodiments according to the remaining figures.

FIG. 5 shows a table with exemplary values for the characteristic values listed therein, which can, for example, be given in the configuration according to FIG. 4.

Figure 6:
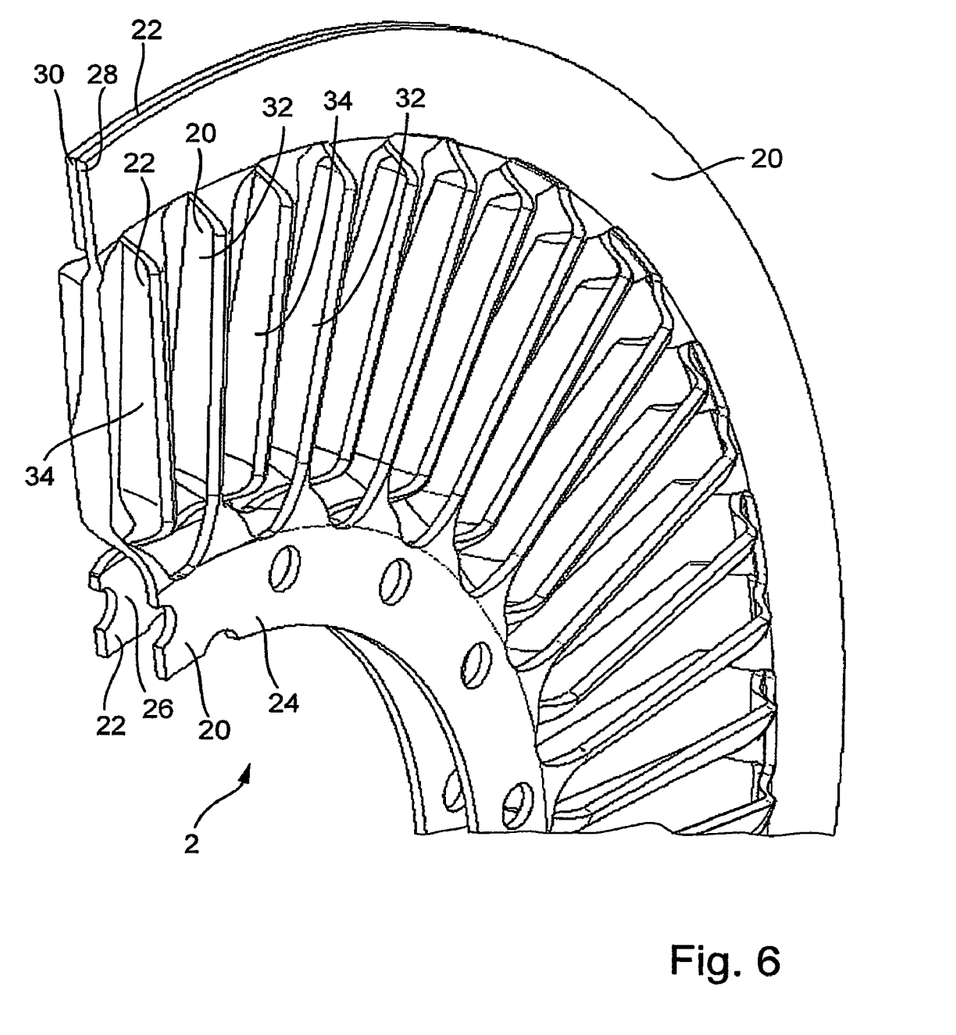
FIG. 6 shows an exemplary embodiment according to the invention in a partial view, which can be a component of a torque converter device according to the invention.

FIG. 6 shows an exemplary embodiment of bladed shell or stator shell 2 according to the invention, which can be a component of exemplary torque converter device 1 according to the invention.

As can be derived from FIG. 6, component 20 and component 22 are provided, which are respectively configured as shaped sheet metal parts. However, it can also be provided, that components 20, 22 are, for example, made in an aluminum manufacturing process.

Component 20 is made from an integral component and forms inner ring 24 and outer ring 28. Also, component 22 is made of an integral part and forms inner ring 26 and outer ring 30.

Radially between inner rings 24, 26 and outer rings 28, 30, a plurality of blades 32, 34 is configured. This is performed, for example, so that blades 32 are respectively associated with component 20, and blades 34 are respectively associated with component 22, or component 20 is integrally configured with "complete" blades 32, and component 22 is integrally configured with "complete" blades 34.

Each of blades 32 or 34 is configured between its respective leading edge and its respective trailing edge from a one-piece component, so that each of blades 32 or 34 is integrally configured by exactly one of components 20, 22.

Also in the embodiments according to FIGS. 2 and 4, it is provided, for example, that therein each of the blades is configured from an integral component between its respective leading edge and its respective trailing edge, so that each of the blades is integrally configured from exactly one of components 20 or 22.

In the configuration according to FIG. 6 it is provided that the axial distance of inner rings 24 and 26 differs from the axial distance of outer rings 28 and 30. This is performed here, so that outer rings 28, 30, viewed in axial direction, contact one another directly, and inner rings 24, 26, viewed in axial direction, have such distance from one another, so that an axial gap is formed between rings 24 and 26. Thus, a spread is created, in order to increase axial stiffness.

DESIGNATIONS

1 torque converter device
2 bladed shell or stator shell
10 step
12 step
14 step
20 first component
22 second component
24 inner ring of 20
26 inner ring of 22
28 outer ring of 20
30 outer ring of 22
32 blade of 20
34 blade of 22
36 inner ring device
40 exemplary conventional blade profile
42 exemplary blade profile according to the invention
44 leading edge of 40
46 trailing edge of 40
48 leading edge of 42
50 trailing edge of 42
60 torque converter
62 pump shell
64 turbine shell
66 converter housing
68 torque converter lockup clutch
70 torsion vibration damper
72 output shaft

What is claimed is:

1. A stator shell for a hydrodynamic torque converter (1), comprising:
   first and second components (20, 22) including first and second outer ring devices, respectively; and,
   first and second pluralities of blades (32, 34), wherein the first and second components (20, 22) are produced separately from one another, wherein the first component includes the first plurality of blades and the second component includes the second plurality of blades, wherein the first and second pluralities of blades are located radially inward of the first and second outer ring elements, respectively, wherein said first and second components (20, 22) are fixed to one another and disposed relative to one another, so that the first and second pluralities of blades (32, 34) of are disposed respectively offset relative to one another in a circumferential direction forming gaps provided in said circumferential direction extending about a central axis of the stator shell (2), wherein each blade of said first and second pluralities of blades (32, 34) is configured as an integral component between its respective leading edge and its respective trailing edge, so that said each blade (32, 34) is integrally formed as part of one of the first or second components (20 or 22), and wherein a portion of at least one blade from the first plurality of blades extends axially beyond the second outer ring device.

2. The stator shell of claim 1, wherein the first or second component (20, 22) is made of sheet metal.

3. The stator shell of claim 1, wherein the first and second components (20, 22) are made of sheet metal.

4. The stator shell of claim 1, wherein said first and second components (20, 22) are respectively integrally produced from an integral component.

5. The stator shell of claim 4, wherein the integral component comprises an integral piece of sheet metal.

6. The stator shell of claim 1, wherein said stator shell (2) comprises first and second inner ring devices (24, 26), which are disposed on the radial inside with reference to a central axis of the stator shell, wherein the first and second outer ring devices (28, 30) are disposed on the radial outside with reference to said central axis, wherein the first and second pluralities of blades (32, 34) extend radially between the first and second inner ring devices (24, 26) and the first and second outer ring devices (28, 30), respectively.

7. The stator shell of claim 1, wherein the first and second components (20, 22) comprise first and second inner rings (24, 26), respectively, and wherein the first and second pluralities of blades (32, 34) (20, (32, are integrally connected to the first and second inner rings (24, 26), respectively and integrally connected to the first and second outer rings (28, 30), respectively.

8. The stator shell of claim 1, wherein respective blades in the first plurality of blades alternate with respective blades in the second plurality of blades in the circumferential direction.

9. The stator shell of claim 1, wherein adjacent blades from the first and second pluralities of blades (32, 34) are separated by a same distance from one another in said circumferential direction.

10. The stator shell of claim 1, wherein the first and second components (20, 22) are placed adjacent to one another in axial direction and joined.

11. The stator shell of claim 1, wherein the first and second components (20, 22) comprise first and second inner rings (24, 26) respectively, and wherein the first plurality of blades, joins said first inner and outer rings and the second plurality of blades joins the second inner and outer rings.

12. The stator shell of claim 1, wherein said stator shell (2) comprises first and second radially interior inner ring devices (24, 26), wherein the first and second outer ring devices (28, 30) are radially exterior, wherein the first and second pluralities of blades (32, 34) are provided radially between the first and second inner ring devices (24, 26) and the first and second outer ring devices (28, 30), wherein a minimum axial blade length (b) is less or equal to 9.5 mm, and a ratio of the maximum axial blade length (b) to an exterior diameter d of the first and second pluralities of blades (32, 34) assumes values, which are less or equal to 0.056, and a ratio of the minimum axial blade length (b) to a converter width (B) is less or equal to 0.18, and wherein the number of blades (32, 34) is greater or equal to 40.

13. The stator shell of claim 1, wherein said stator shell (2) comprises first and second radially interior inner ring devices (24, 26), wherein the first and second outer ring devices (28, 30) are radially exterior, wherein the first and second pluralities of blades of blades (32, 34) are provided radially between the first and second inner ring devices (24, 26) and the first and second outer ring devices (28, 30), respectively, wherein a minimum axial blade length (b) is less or equal to 9.5 mm, and a ratio of the maximum axial blade length (b) to an exterior diameter d of the first and second pluralities of blades (32, 34) assumes values, which are less or equal to 0.056, or a ratio of the minimum axial blade length (b) to a converter width (B) is less or equal to 0.18, and wherein the number of blades (32, 34) is greater or equal to 40.

14. The stator shell of claim 1, wherein said stator shell (2) comprises first and second radially interior inner ring devices (24, 26), wherein the first and second outer ring devices (28, 30) are radially exterior, wherein the first and second plurality of blades (32, 34) are provided radially between the first and second inner ring devices (24, 26) and the first and second outer ring devices (28, 30), respectively, wherein a minimum axial blade length (b) is less or equal to 9.5 mm, or a ratio of the maximum axial blade length (b) to an exterior diameter d of the first and second pluralities of blades (32, 34) assumes values, which are less or equal to 0.056, and a ratio of the minimum axial blade length (b) to a converter width (B) is less or equal to 0.18, and wherein the number of blades (32, 34) is greater or equal to 40.

15. The stator shell of claim 1, wherein said stator shell (2) comprises first and second radially interior inner ring devices (24, 26), wherein the first and second outer ring devices (28, 30) are radially exterior, wherein the plurality of blades (32, 34) are provided radially between the first and second inner ring devices (24, 26) and the first and second outer ring devices (28, 30), respectively, wherein a minimum axial blade length (b) is less or equal to 9.5 mm, or a ratio of the maximum axial blade length (b) to an exterior diameter d of the first and second pluralities of blades (32, 34) assumes values, which are less or equal to 0.056, or a ratio of the minimum axial blade length (b) to a converter width (B) is less or equal to 0.18, and wherein the number of blades (32, 34) is greater or equal to 40.

16. The stator shell of claim 1, wherein said first and second components (20, 22) are fix to one another and respectively comprise first and second inner rings (24, 26), wherein an axial distance between the first and second outer rings (28, 30) and an axial distance between the first and second inner rings (24, 26) deviate from one another in order to form a spread to increase the stiffness.

17. A torque converter for motor vehicles, wherein said torque converter (1) comprises a pump shell (62), a turbine shell (64), and a stator shell (2), wherein the stator shell (2) is configured according to claim 1.

18. A method for producing a stator shell (2) for a hydrodynamic torque converter (1), comprising the following steps:
   providing at least one piece of sheet metal forming a first plane or one sheet metal blank forming a second plane;
   processing the at least one sheet metal piece or the sheet metal blank by cutting; and
   processing the at least one sheet metal piece or the sheet metal blank to form first and second components of the stator shell (2), comprising first and second outer ring devices and first and second pluralities of blades (32, 34) located radially inward of the first and second outer ring devices, respectively, by displacing or bending the first and second pluralities of blades (32, 34) relative to the first or second planes; and,
   fixing the first and second components to each other such that a portion of at least one blade from the first plurality of blades extends axially beyond the second outer ring device.

* * * * *